United States Patent
Sanchez Animas

(10) Patent No.: US 11,389,738 B2
(45) Date of Patent: Jul. 19, 2022

(54) OMNI WHEEL-BASED HUMAN POWERED SPINNING SYSTEM AND/OR VERSATILE MOTION SIMULATOR DEVELOPMENT PLATFORM WITH UNLIMITED RANGE OF ROTATION ALONG PITCH, ROLL AND YAW AXES

(71) Applicant: Martin Alonso Sanchez Animas, Tlanepantla (MX)

(72) Inventor: Martin Alonso Sanchez Animas, Tlanepantla (MX)

( * ) Notice: Subject to any disclaimer, the term of this patent is extended or adjusted under 35 U.S.C. 154(b) by 0 days.

(21) Appl. No.: 16/017,095

(22) Filed: Jun. 25, 2018

(65) Prior Publication Data

US 2019/0388795 A1  Dec. 26, 2019

Related U.S. Application Data

(60) Provisional application No. 62/524,814, filed on Jun. 26, 2017.

(51) Int. Cl.
| | |
|---|---|
| *A63G 31/02* | (2006.01) |
| *G09B 9/02* | (2006.01) |
| *B60B 19/00* | (2006.01) |
| *G09B 9/52* | (2006.01) |
| *G09B 9/06* | (2006.01) |
| *G09B 9/04* | (2006.01) |
| *G09B 9/058* | (2006.01) |
| *G09B 9/12* | (2006.01) |

(52) U.S. Cl.
CPC ............ *A63G 31/02* (2013.01); *B60B 19/003* (2013.01); *G09B 9/02* (2013.01); *G09B 9/04* (2013.01); *G09B 9/058* (2013.01); *G09B 9/06* (2013.01); *G09B 9/12* (2013.01); *G09B 9/52* (2013.01)

(58) Field of Classification Search
CPC ........ A63G 21/08; A63G 27/00; A63G 27/02; A63G 27/08; A63G 31/00; A63G 31/16; A63G 31/02; G09B 9/00; G09B 9/02; G09B 9/08; G09B 9/12
USPC .................... 472/47, 59–61, 130; 434/29, 55
See application file for complete search history.

(56) References Cited

U.S. PATENT DOCUMENTS

| | | | | |
|---|---|---|---|---|
| 1,393,456 A | * | 10/1921 | Ruggles | G09B 9/12 180/2.1 |
| 2,069,664 A | * | 2/1937 | Bartlett | A63J 13/00 104/84 |
| 2,960,878 A | * | 11/1960 | Lees | G01C 21/16 74/5 R |
| 4,489,932 A | * | 12/1984 | Young | A63B 19/04 472/14 |
| 5,060,932 A | * | 10/1991 | Yamaguchi | A63G 31/16 434/34 |
| 5,702,307 A | * | 12/1997 | Moran | A63G 31/16 472/130 |
| 5,725,435 A | * | 3/1998 | De Castro Faria | A63G 31/00 472/47 |

(Continued)

*Primary Examiner* — Kien T Nguyen

(57) ABSTRACT

The present disclosure is directed to wheel-based human-powered spinning system comprising: a chassis configured to secure a user; a track surrounding said chassis; and at least one omni wheels attached to said chassis, wherein said chassis spins with unlimited range of motion, along pitch, yaw and roll axes, inside the track while supported by said at least one omni wheels, said track being independent of contact from said chassis.

13 Claims, 21 Drawing Sheets

(56) References Cited

U.S. PATENT DOCUMENTS

| | | | | |
|---|---|---|---|---|
| 6,563,489 B1* | 5/2003 | Latypov | ................... | G06F 3/011 |
| | | | | 345/156 |
| 2002/0183123 A1* | 12/2002 | De-Gol | ................... | A63G 31/16 |
| | | | | 472/59 |
| 2005/0277092 A1* | 12/2005 | Hwang | .................... | G09B 9/12 |
| | | | | 434/55 |

* cited by examiner

US 11,389,738 B2

OMNI WHEEL-BASED HUMAN POWERED SPINNING SYSTEM AND/OR VERSATILE MOTION SIMULATOR DEVELOPMENT PLATFORM WITH UNLIMITED RANGE OF ROTATION ALONG PITCH, ROLL AND YAW AXES

CROSS REFERENCE TO RELATED APPLICATIONS

This application claims the benefit of U.S. Provisional Application Ser. No. 62/524,814, entitled "OMNI WHEEL-BASED HUMAN POWERED SPINNING SYSTEM AND/OR VERSATILE MOTION SIMULATOR DEVELOPMENT PLATFORM WITH UNLIMITED RANGE OF ROTATION ALONG PITCH, ROLL AND YAW AXES" and filed on Jun. 26, 2017, the entirety of which is herein incorporated by reference.

TECHNICAL FIELD

The present disclosure generally relates to systems and methods for providing versatile motion simulation, such as by using rotational structures that allow motion along various axes, which a human, vehicle or other subject can be placed in.

BACKGROUND

Many structures, devices or set-ups that allow for rotational movement only permit movement in certain directions and do not allow movement in directions along additional axes. This is a limitation of the technology where no wheel structure or other mechanism allows for movement in multiple directions. Therefore, there is a need in the art for a spinning system that permits an unlimited range of rotation along multiple axes of orientation which is also lighter, easier to build, more compact, less maintenance intensive, and more versatile as well as safe.

By way of background, the first omni wheels was patented in 1909 (U.S. Pat. No. 1,305,535), the first electromechanical gyroscopic type flight simulator, the "Ruggless Orientator" (U.S. Pat. No. 1,393,456 A), was first filed for patent in 1918. Today, in spite of the fact that more than 100 years have passed since the first omni wheels was patented, and 100 years since the first electromechanical gyroscopic simulator was built, engineering and robotics students, motion simulator manufacturing companies, and DIY enthusiasts all over the world, still continue developing, improving and experimenting with the same types of motion development platforms invented in the past, such as the Ruggles Orientator type simulator (e.g. U.S. Pat. No. 5,725,435 A to Castro de Farina), and the Stewart platform type simulator (e.g. US 20050277092 A1 to Thong-Shing Hwang). The above mentioned motion simulator platforms still remain the primary option despite their elevated manufacturing and maintenance costs, high transportation costs, cumbersome sizes, and last but not least, extremely limited range of motion, as is the case especially with Stewart platform type simulators.

Other inventions have proposed motion simulators implementing a base frame provided with caster wheels and a spherical shell that sits and spins on top of said caster wheels (e.g. U.S. Pat. No. 4,489,932 A to Gary L. Young, and U.S. Pat. No. 6,563,489 B1 to Latypov). However, the present disclosure is the first method and device to implement a motion simulator development platform which attaches omni wheels directly onto a chassis which spins inside a track. This system produces a versatile and easy-to-build motion simulator development platform capable of unlimited rotation range about all the rotational axes e.g., pitch, roll and yaw.

In addition, other inventions such as U.S. Pat. No. 2,960,878 to Lees Sidney involve a gimbal structure that generates undue amounts of friction due to its usage of conventional unidirectional wheels that can only move in a single direction. In such an implementation, the wheels also act as brakes because the lateral friction prevents the gimbals from moving in any direction. Also, there is no access means or entryway for a person or vehicle, for example, to enter the gimbal structure. Furthermore, the bladed wheels are non-operational because the bladed wheel will propel the gimbal structure in a direction perpendicular to the wall of the case. As such, when the bladed wheel spins, it will cause e.g., liquid to propel directly perpendicular to the surface of the case wall 20 and the gimbals structure will be pushed in a direction opposite the wall, but since there is no place for the spherical case 22 to go, it will just move randomly without any direction control whatsoever. The drive wheels 38 are also non-operational because normal wheels oppose excessive lateral resistance. The inventor Sidney tries to alleviate said friction problems by adding bearings and liquid to make the sphere case 22 buoyant. However, that does not eliminate the friction problem. For the wheel to also properly engage against the wall of the case 20, the surface of the wheels need to be of a non-slippery material such as rubber. This would solve the traction problem, but at the same time, because, the wheels need to be positioned perpendicular to each other, the lateral friction imposed by unidirectional wheels will act as a break, literally stopping the gimbals on its track. As a result, Lees Sidney's gimbals structure will not be able to rotate in any direction. The inventor Sidney's hydraulic drives (impeller) also have the same problem as the bladed wheels because when in operation, the impeller will spin, and upon spinning it will behave in the same manner as a propeller, pushing water directly against the wall of the case 20. Therefore, the gimbals structure will try to move in a direction opposite the case wall 22, which is not the result which the inventor Sidney was trying to achieve. Another issue with Sidney's invention is that there is no power source to operate the drive motors and other electrical components. Inventor Sidney's device is able to "bring power in to the inner sphere or gimbals to operate the various drive motors of the drive subsystem and the orientation detectors. A number of highly flexible leads may be inserted through an opening (not shown) in the case 20, which prevents loss of the liquid from the case, and these wires may be threaded through a similar opening (not shown) in the gimbals to the various points where power is necessary. [The] Flat flexible conductors now readily available may be used for this purpose". In other words, Sidney pretends to insert cable leads thru openings in the outer case 20 and openings through the gimbals case 22 to supply electricity to his drive motors and sensors. This is a big problem because said cable will prevent the gimbals structure from moving freely in all directions. It would be similar to putting a leash on your dog, tying it to a tree and telling the dog that it is now free to go in any direction it wants. The gimbals might be able to perform a number of spins but eventually said leads will twist so bad that they either break or stop the invention dead on its tracks. This leads to large problems in inefficiency, cost and freedom of rotation.

Thus, in contrast to what came before and for the very first time, a truly affordable, low maintenance, motion simulator capable of infinite rotation about all three rotational axes is provided and finally within reach of the average consumer, said motion simulator being useful for a wide range of applications including, but not limited to, simulation of land, sea, air, and space vehicles, and even for simulation of wing suit flight or walking in place simulation.

Since various modifications may be made in my disclosed subject matter as herein above described, and many, apparently widely different embodiments of same, made within the spirit and scope of the claims without departing from such spirit and scope, it is intended that all matter contained in the accompanying specification shall be interpreted as illustrative only and not in a limiting sense.

Although the present disclosure and its advantages have been described in detail, it should be understood that various changes, substitutions and alterations can be made herein without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present application is not intended to be limited to the particular configurations of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding configurations described herein may be utilized according to the present disclosure. Accordingly, the appended claims are intended to include within their scope such processes, machines, manufacture, compositions of matter, means, methods, or steps.

SUMMARY

Provided is a wheel-based human-powered spinning system comprising: a chassis configured to secure a user; a track surrounding said chassis; and at least one omni wheels attached to said chassis, wherein said chassis spins with unlimited range of motion in any direction inside the track while supported by said at least one omni wheels, said track being independent of contact from said chassis.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

Glossary of Terms

Motion simulator development platform or motion simulator: A framework, structure, or device serving as the basis for building motion simulators and other revolving devices.

Figure 1:
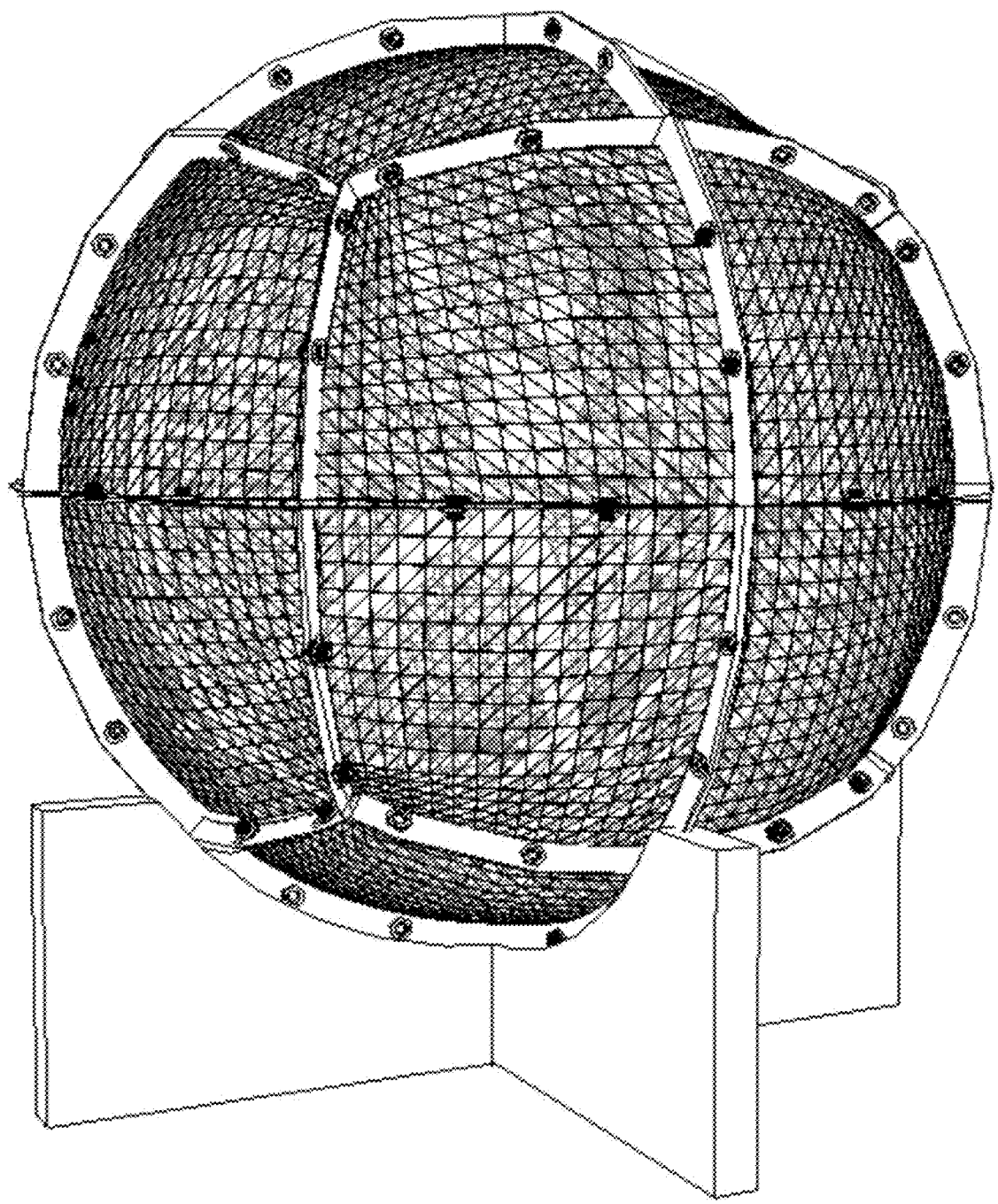

Track (10): It refers to the container which encapsulates said chassis (20), and acts as a track to guide said chassis (20) to rotate concentrically while keeping it from rolling away from its proper position. Said track (10) may be a self-standing shaped structure or may have a base, or may be adapted to some other type of support or device, e.g. base, robotic arm, swivel, Stewart platform, holonomic vehicle, etc., in order to add extra degrees of displacement such as transnational movement, horizontal movement, vertical movement, sideways movement, etc.

Omni wheel (30): A special type of wheel which opposes little or null lateral resistance. Included are, but not limited to, multi-directional/unidirectional wheels, casters, swivel wheels, rollers, etc.

Chassis (20): It refers to a frame, capsule, cabin, container, etc., to which wheels and other components are attached to. Said chassis houses the user (40). Said chassis may be any size, any material, any shape, as long as its configuration enables said chassis to spin within said track (10). Said chassis can be any shape which allows for placing a user inside of it. Said chassis can also be structured so that when the omni wheels (30) are attached to the chassis, said omni wheels can still make contact with the inner surface of the track while the chassis (20) does not make contact with the track. Said chassis (20) may touch said track (10) as long as he is little or non friction preventing it from spinning freely.

User (40): A person, animal, living thing, robot, device, substance, positioned inside said chassis (20). Note: On certain embodiments, the disclosed subject matter may be controlled remotely (unmanned).

U Bracket 1 (203): a securing component used for holding components together and improve the rigidity and stability of structures.

U Bracket 2 (205): a securing component used for holding components together and improve the rigidity and stability of structures.

Bolts and nuts (206)

Tensor plate (204)

Power source: It refers to the means of energy or force that causes said chassis (20) to spin. It may also be a person, a robot, an electric battery, a motor, or any source of energy that causes said chassis (20) to go from a static position into a rotational movement.

Triaxial: 3 axes, namely, roll, yaw and pitch.

Access: an opening, hatch door, etc., which allows for the user (40) to enter and exit the motion simulation platform of the present subject matter.

FIG. 1 is a representation of one embodiment of said omniwheel-supported chassis (20), said user (40) inside said track (10), with said track (10) sitting on top of said base (70), according to an aspect of the present disclosure.

Figure 2:
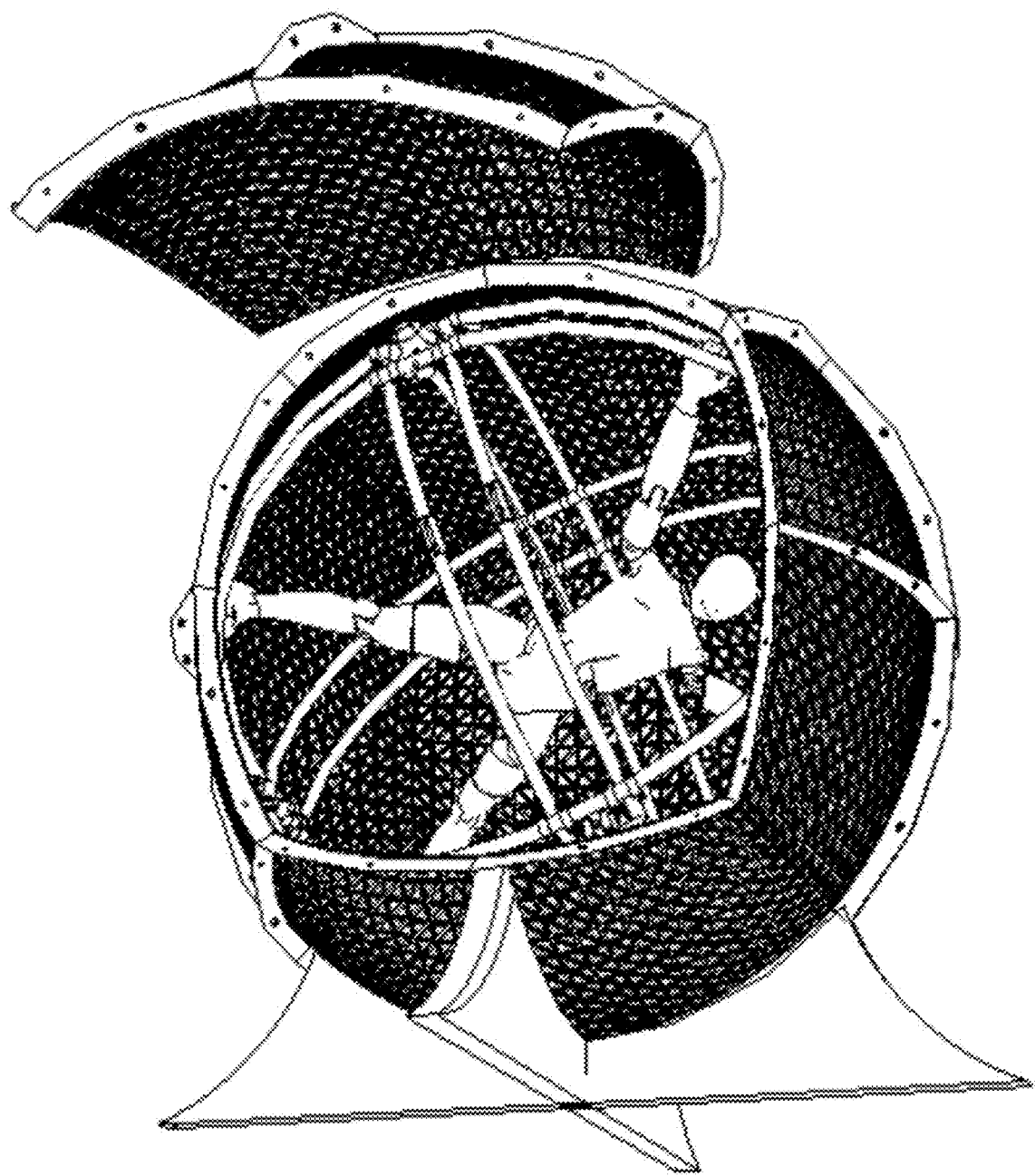

FIG. 2 is a representation of one embodiment of said omniwheel-supported chassis (20), said user (40) inside said track (10), sitting on said base (70), with the access opened in order to allow a pick to the inside, according to an aspect of the present disclosure.

Figure 3:
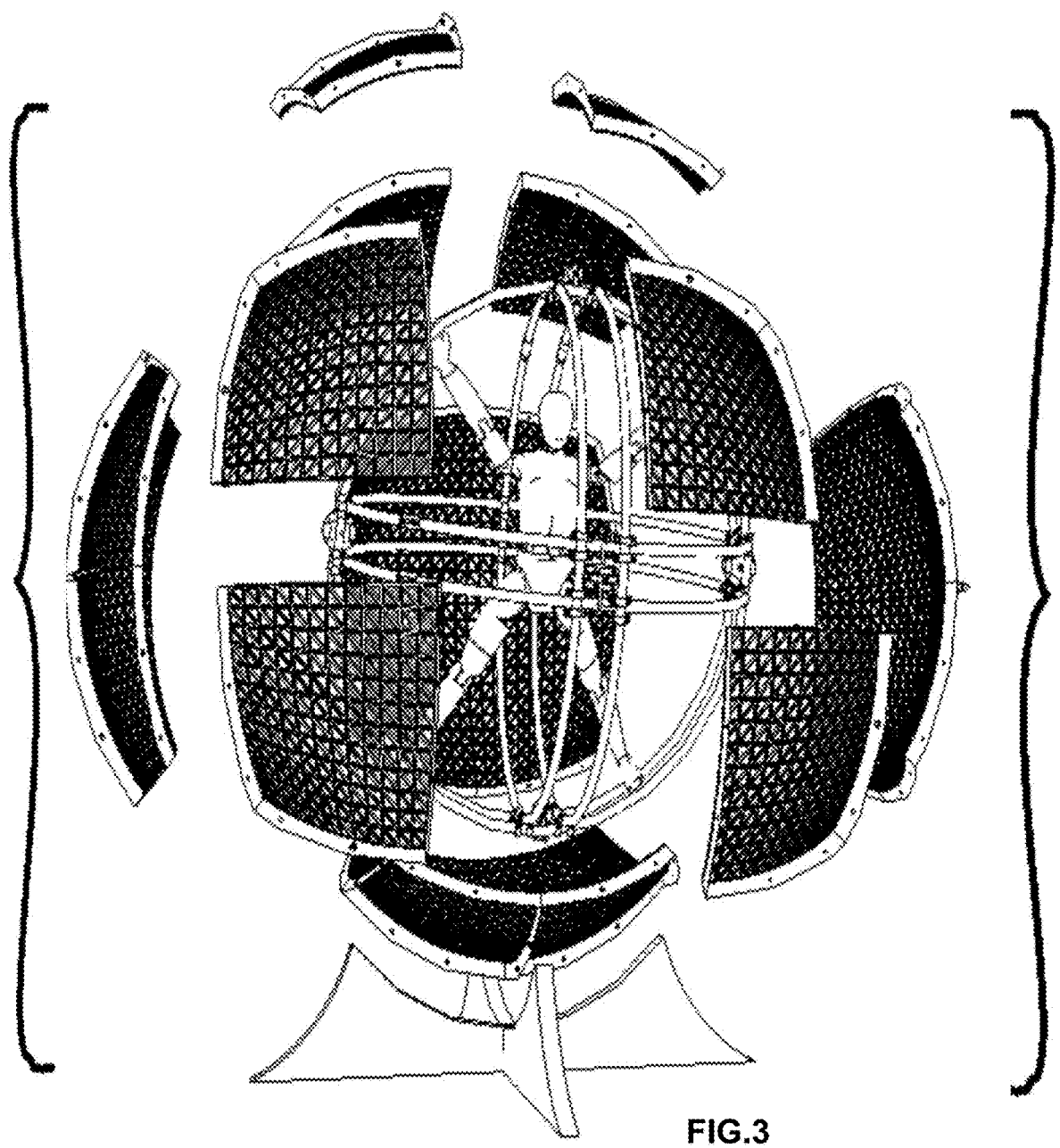

FIG. 3 is an exploded-view representation of one embodiment of said omniwheel-supported chassis (20) and omni wheels (30), said user (40) inside said track (10), sitting on said base (70), according to an aspect of the present disclosure.

Figure 4:
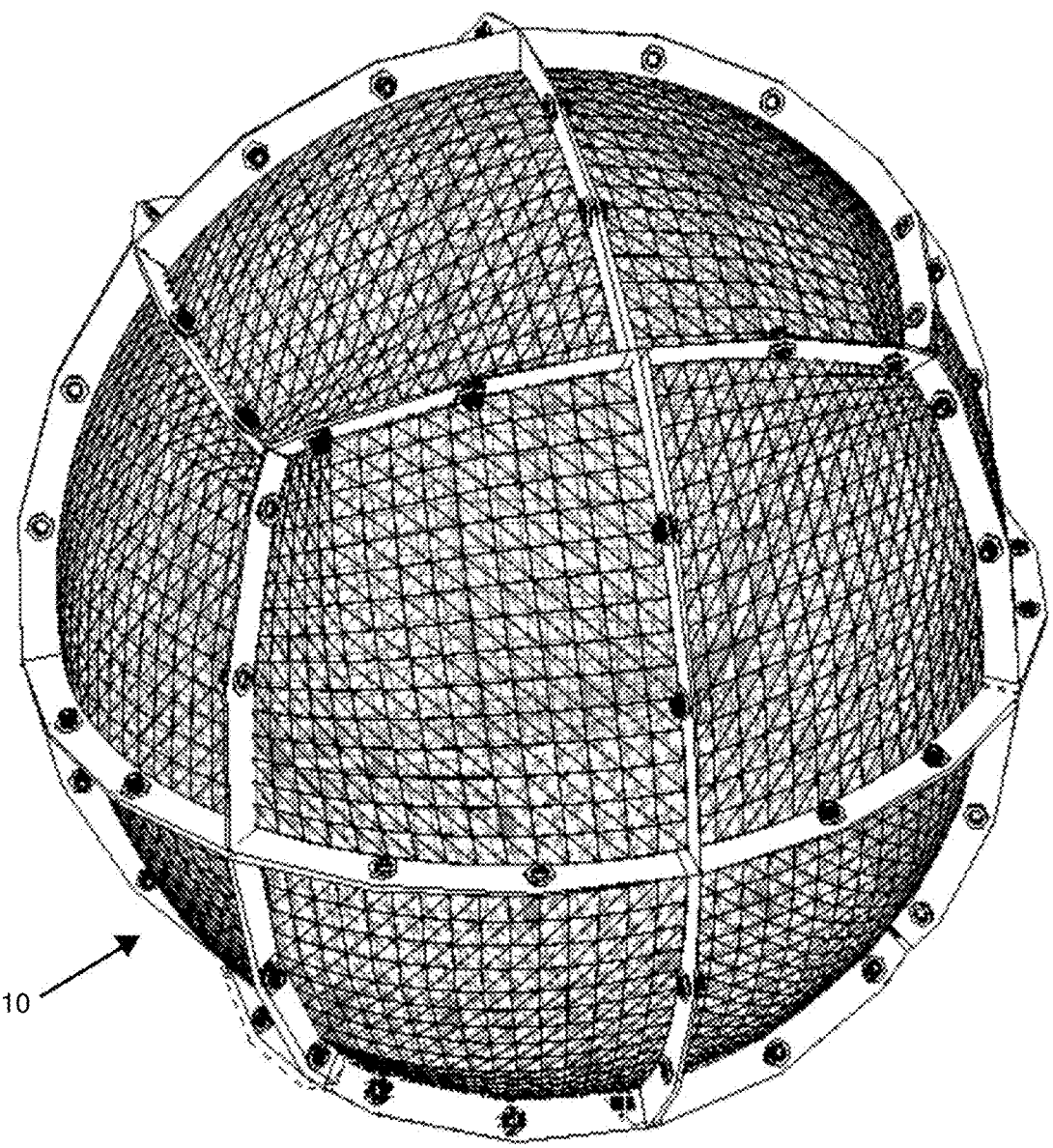

FIG. 4 is a representation of one embodiment of said track (10) made from 24 rhomboids of equal size and shape, according to an aspect of the present disclosure.

Figure 5:
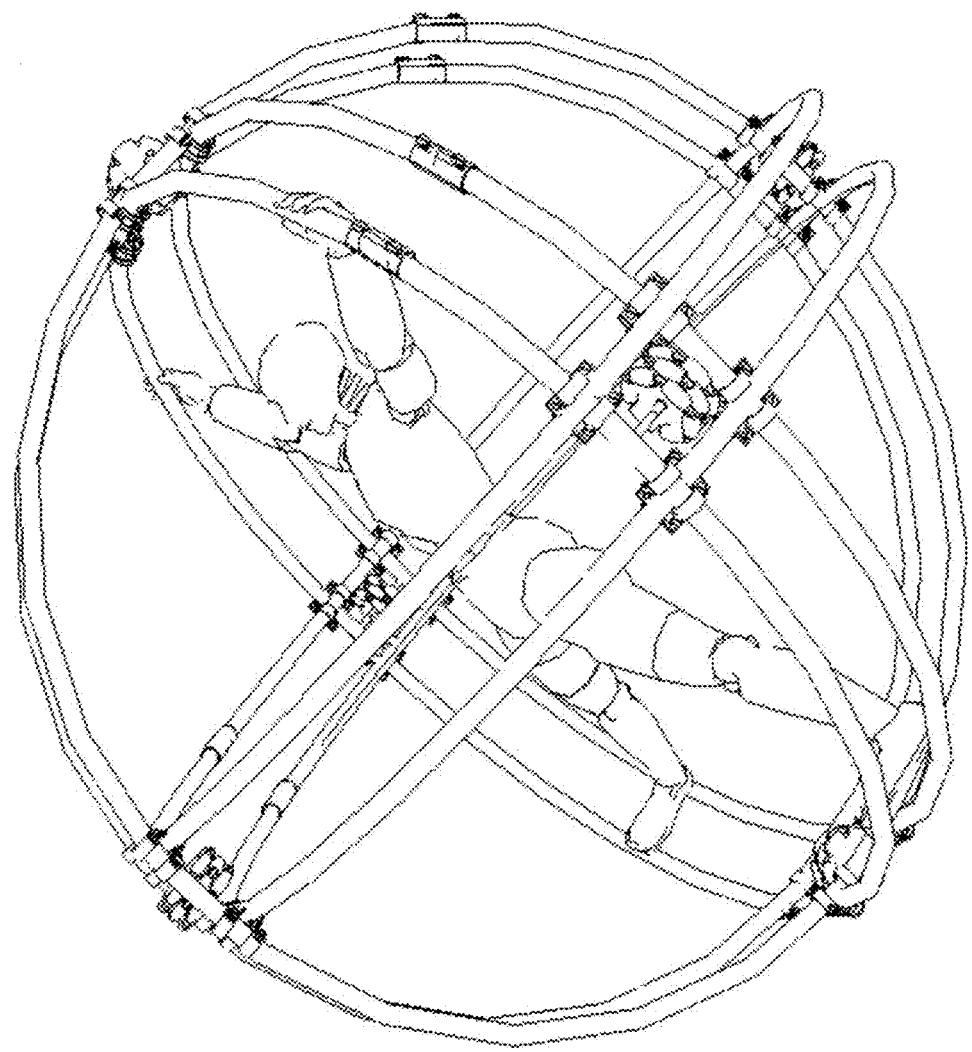

FIG. 5 is a representation of said chassis (20), with said omni wheels (30) attached, and said user (40), according to an aspect of the present disclosure.

Figure 6:
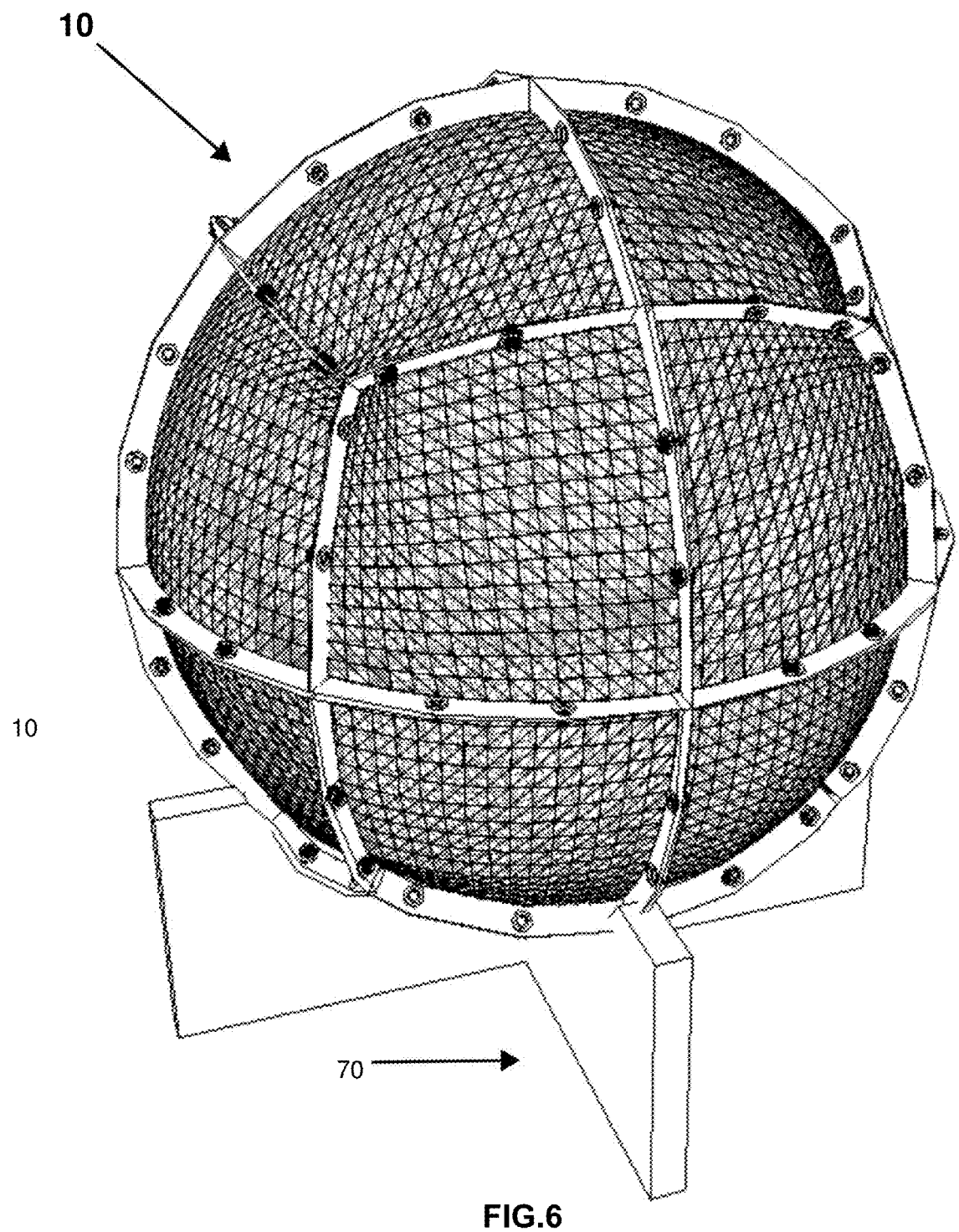

FIG. 6 is a representation of one embodiment of said track (10), sitting on top of said base (70), according to an aspect of the present disclosure.

Figure 7:
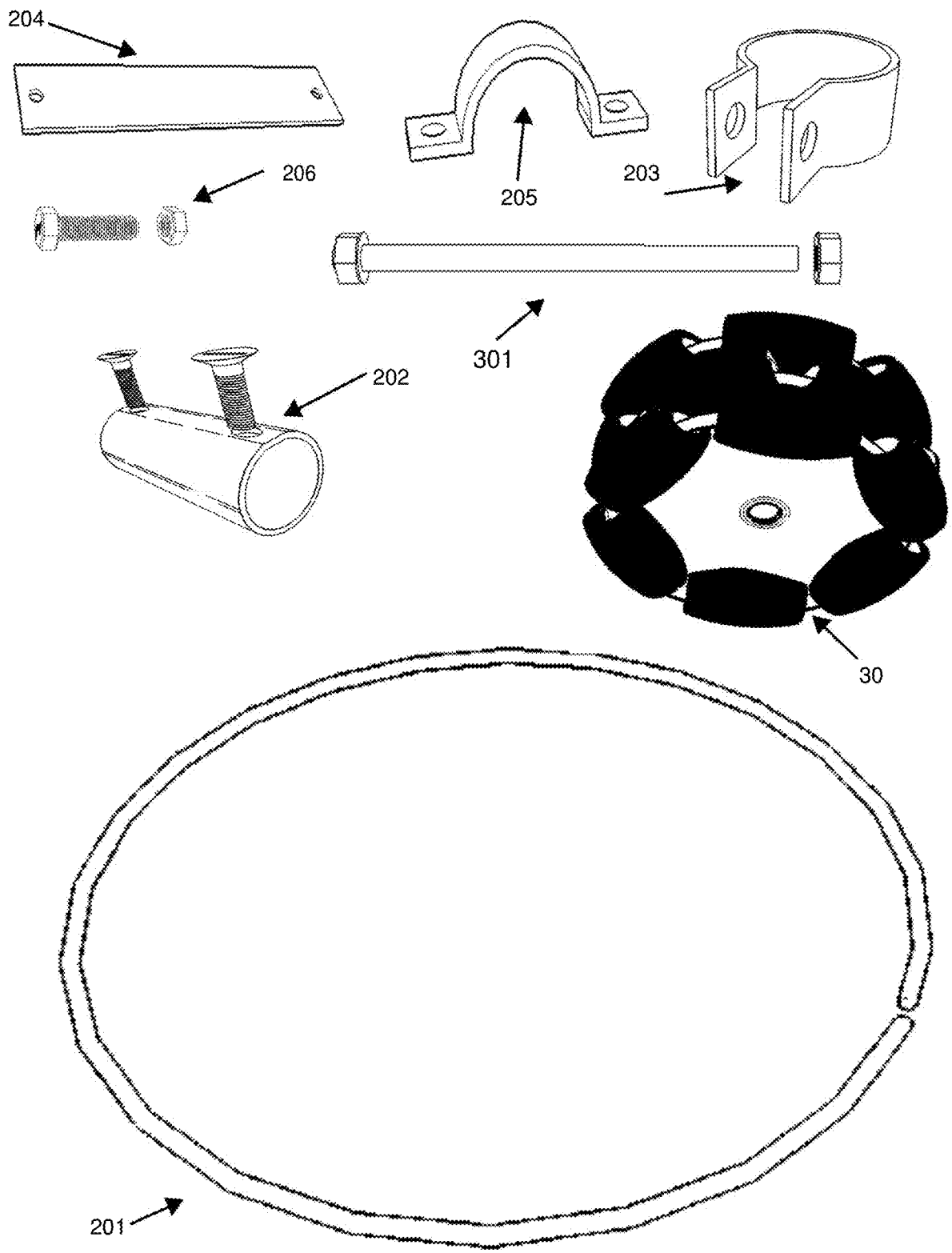

FIG. 7 is a representation of basic components that can be used to make said chassis (20), including (e.g. aluminum pipe) ring (201), pipe coupler (202), U bracket 1(203) tensor plate (204), U bracket 2(205), bolts and nuts (206), omni wheel (30), and wheel axle (301), according to an aspect of the present disclosure.

Figure 8:
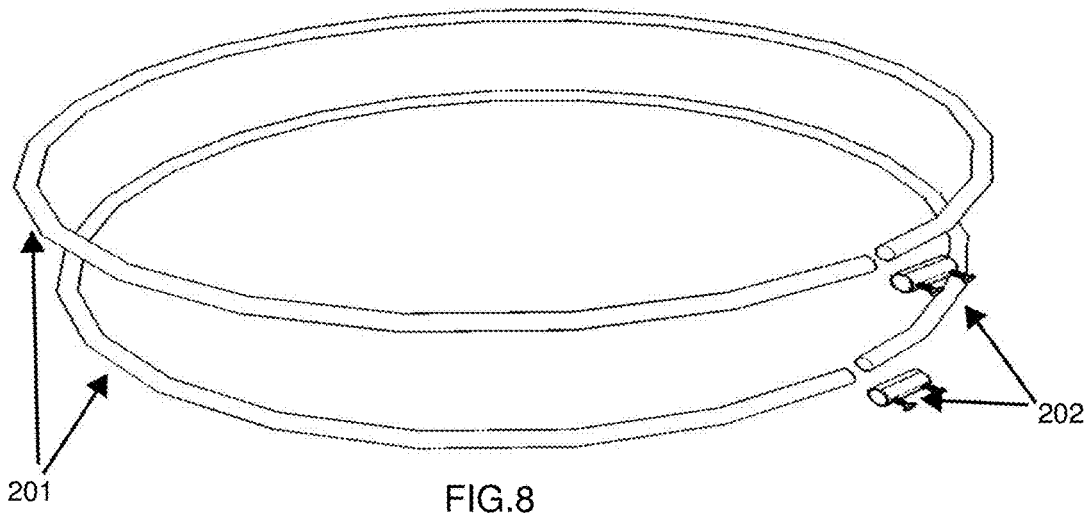

FIG. 8 is a representation of a pair of rings (201) formed from e.g. bent aluminum piping and a pair of pipe couplers (202) before assembly, according to an aspect of the present disclosure.

Figure 9:
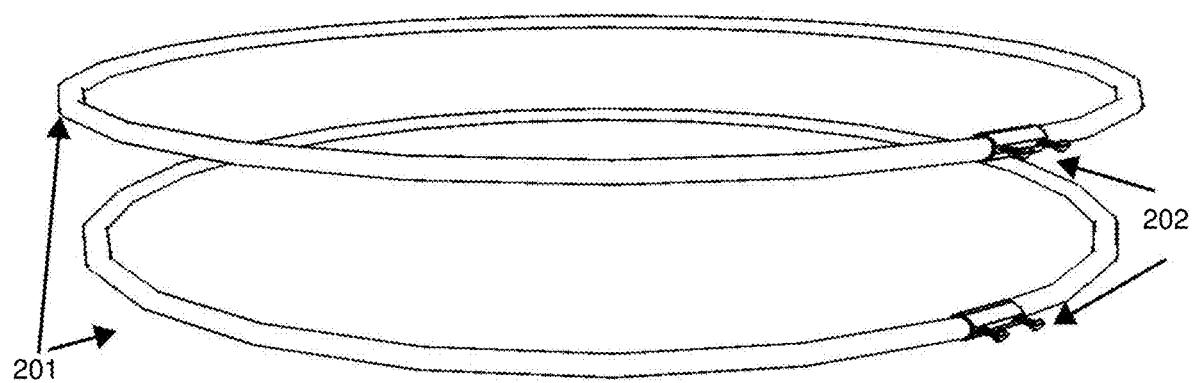

FIG. 9 is a representation of a pair of rings (201) formed from bent aluminum piping and a pair of pipe couplers (202) after assembly, according to an aspect of the present disclosure.

Figure 10:
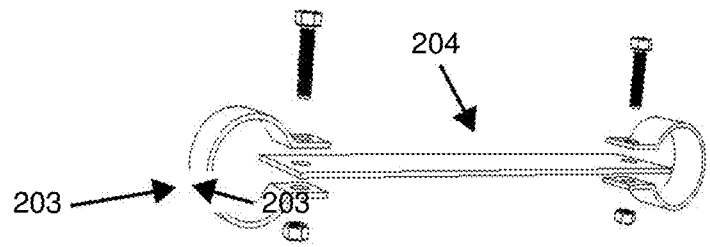

FIG. 10 shows a subassembly combining U bracket 1 (203) and tensor plate (204) that can be use to add structural strength to said chassis (20), as well as establish a uniform separation between rings (201), according to an aspect of the present disclosure.

Figure 11:
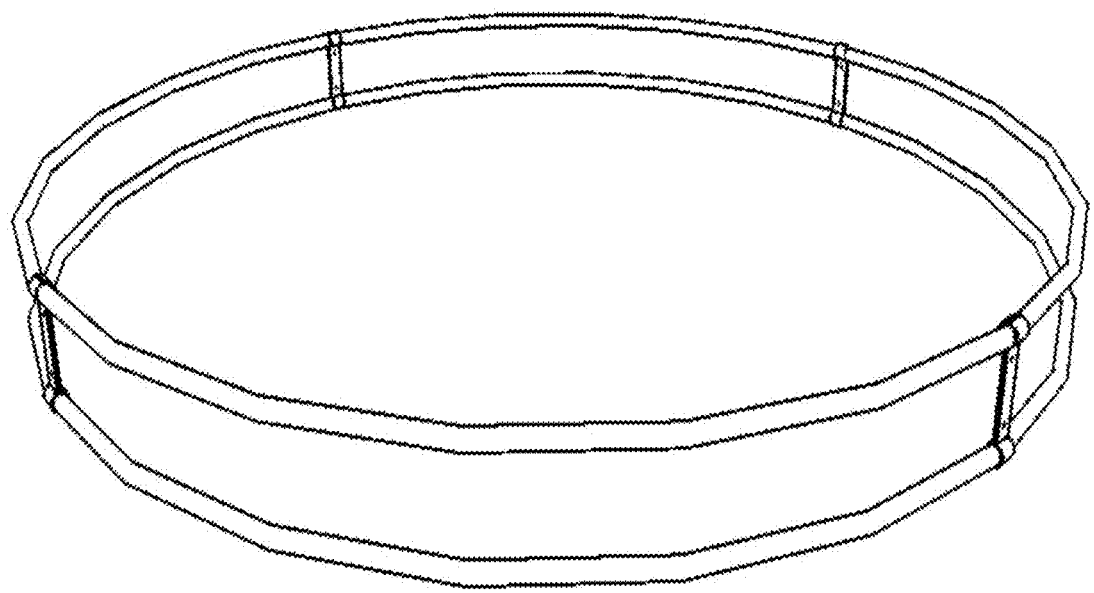

FIG. 11 is a representation of a ring subassy that can be put together by assembling said rings (201) and said U bracket 2 (205), said tensor plate (204), and bolts and nuts (206), according to an aspect of the present disclosure.

Figure 12:
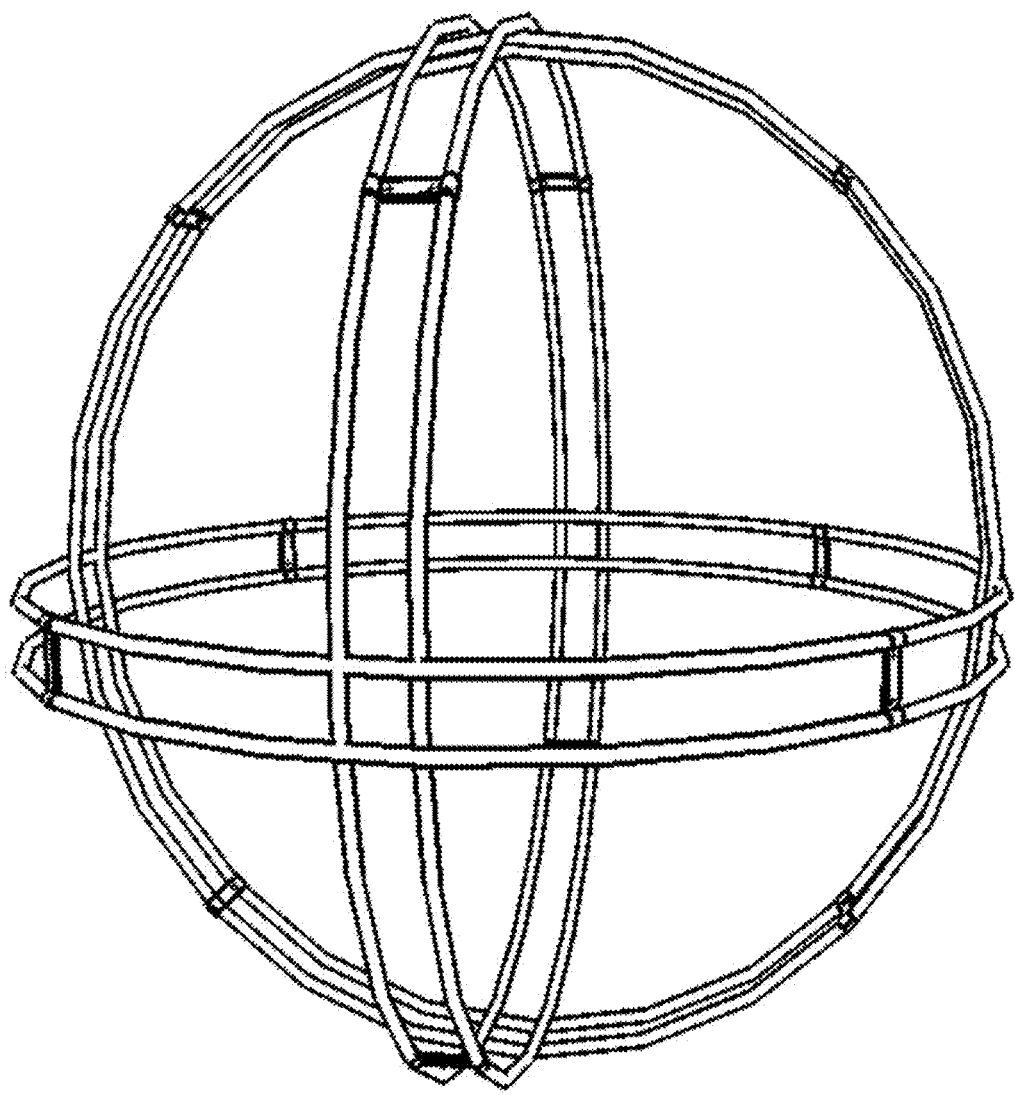

FIG. 12 is a representation of 3 pairs of ring subassemblies (FIG. 11) combined together in order to assemble said chassis (20), according to an aspect of the present disclosure.

Figure 13:
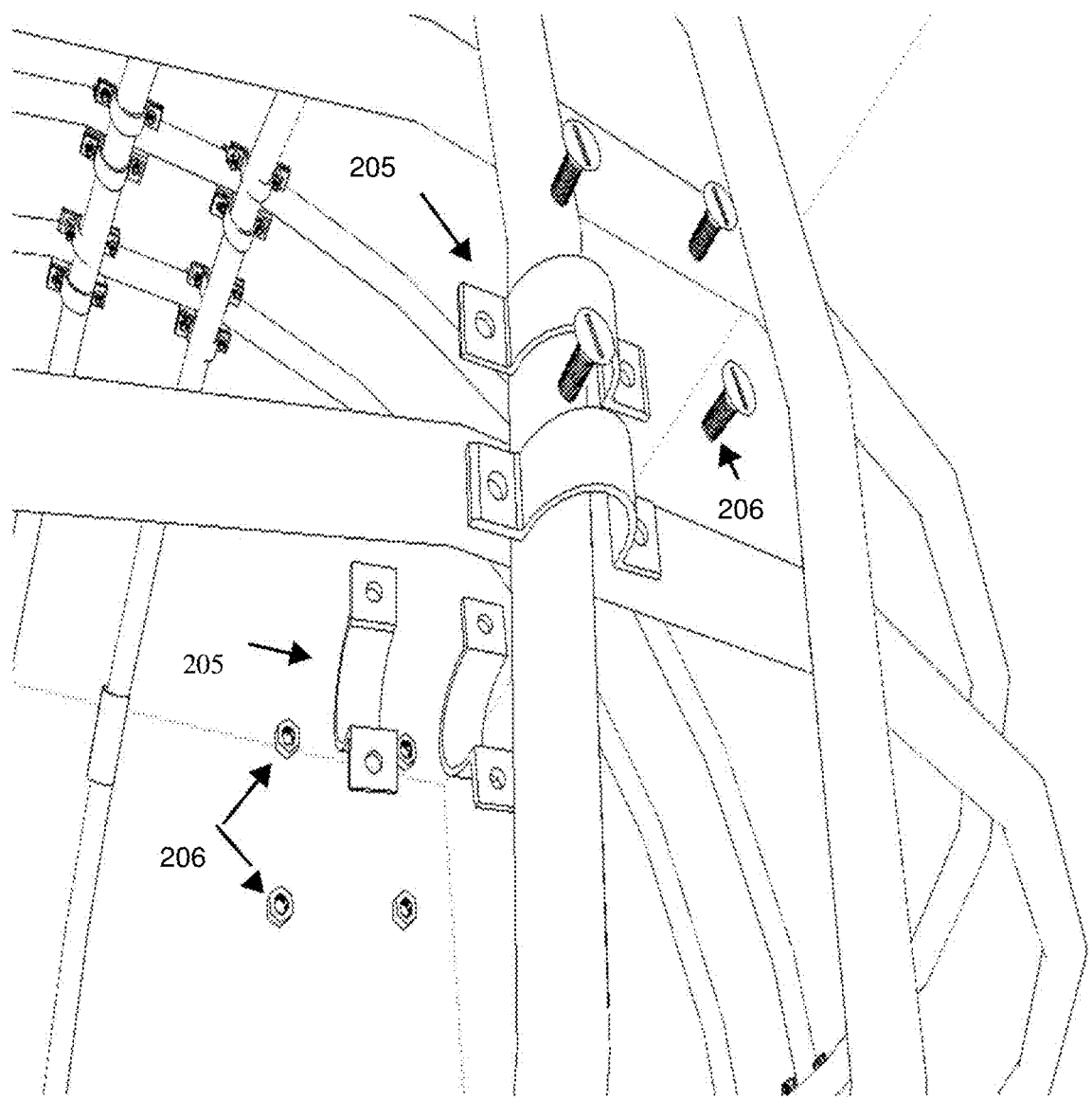

FIG. 13 is a representation of how u brackets 1 (203) and bolts and nuts (206) can be used to secure said ring subassemblies (FIG. 11), in order to assemble said chassis (20), according to an aspect of the present disclosure.

Figure 14:
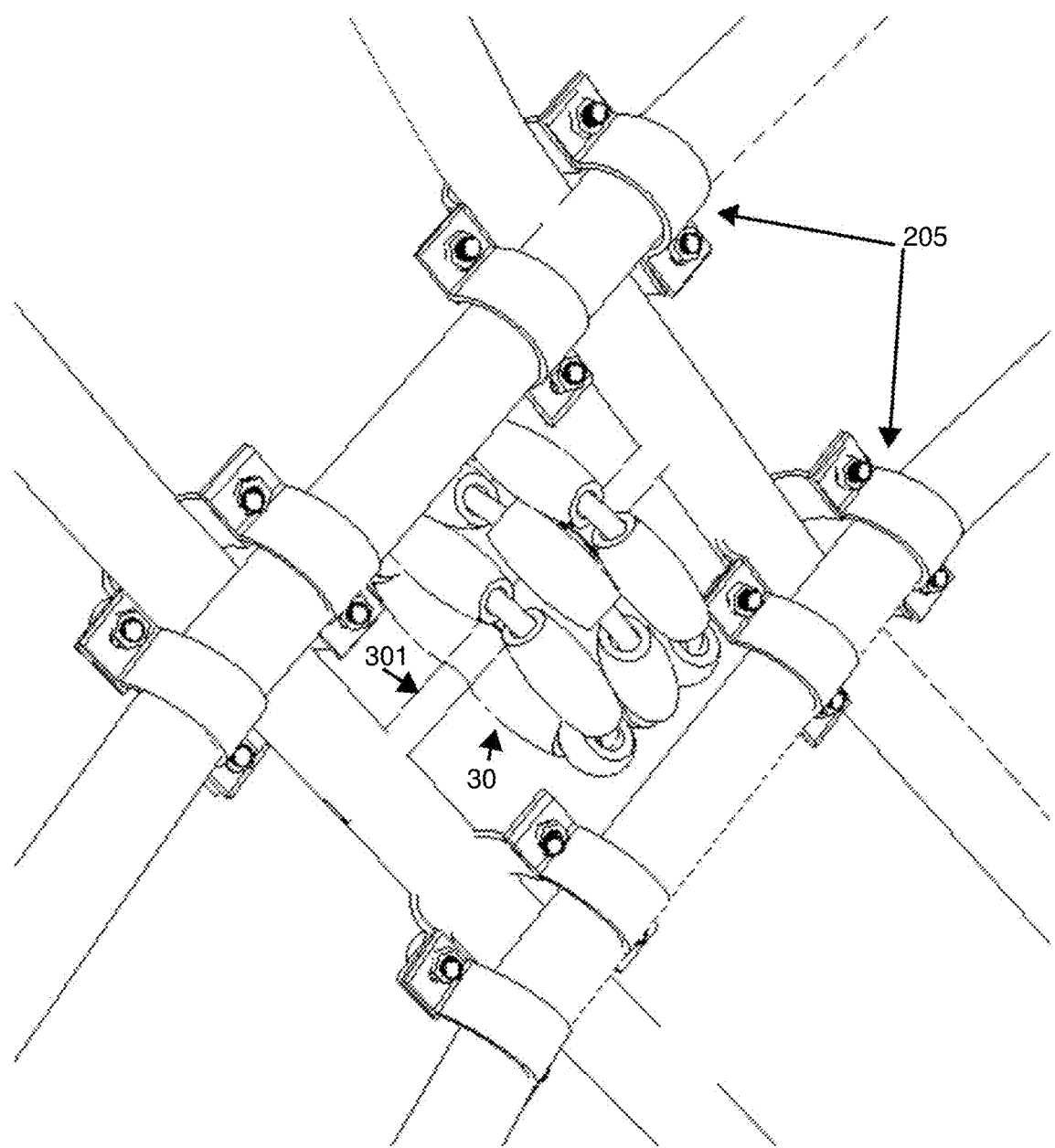

FIG. 14 is a representation of how u brackets 1 (203) and bolts and nuts (206) can be used to secure said ring subassemblies (FIG. 11), in order to assemble said chassis (20), according to an aspect of the present disclosure.

Figure 15:
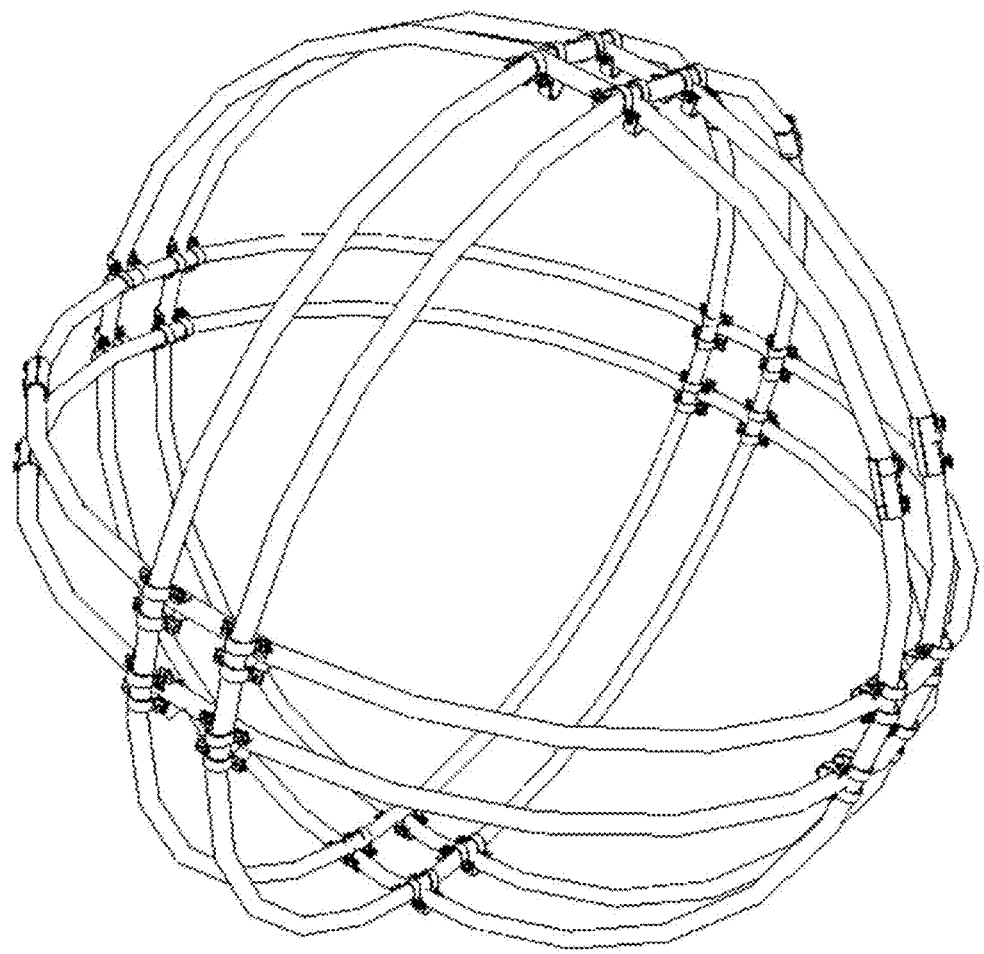

FIG. 15 is a representation of said chassis (20) put together using (e.g. aluminum) rings (201), U brackets 1 (203), and U brackets 2 (205), and bolts and nuts (206), according to an aspect of the present disclosure.

Figure 16:
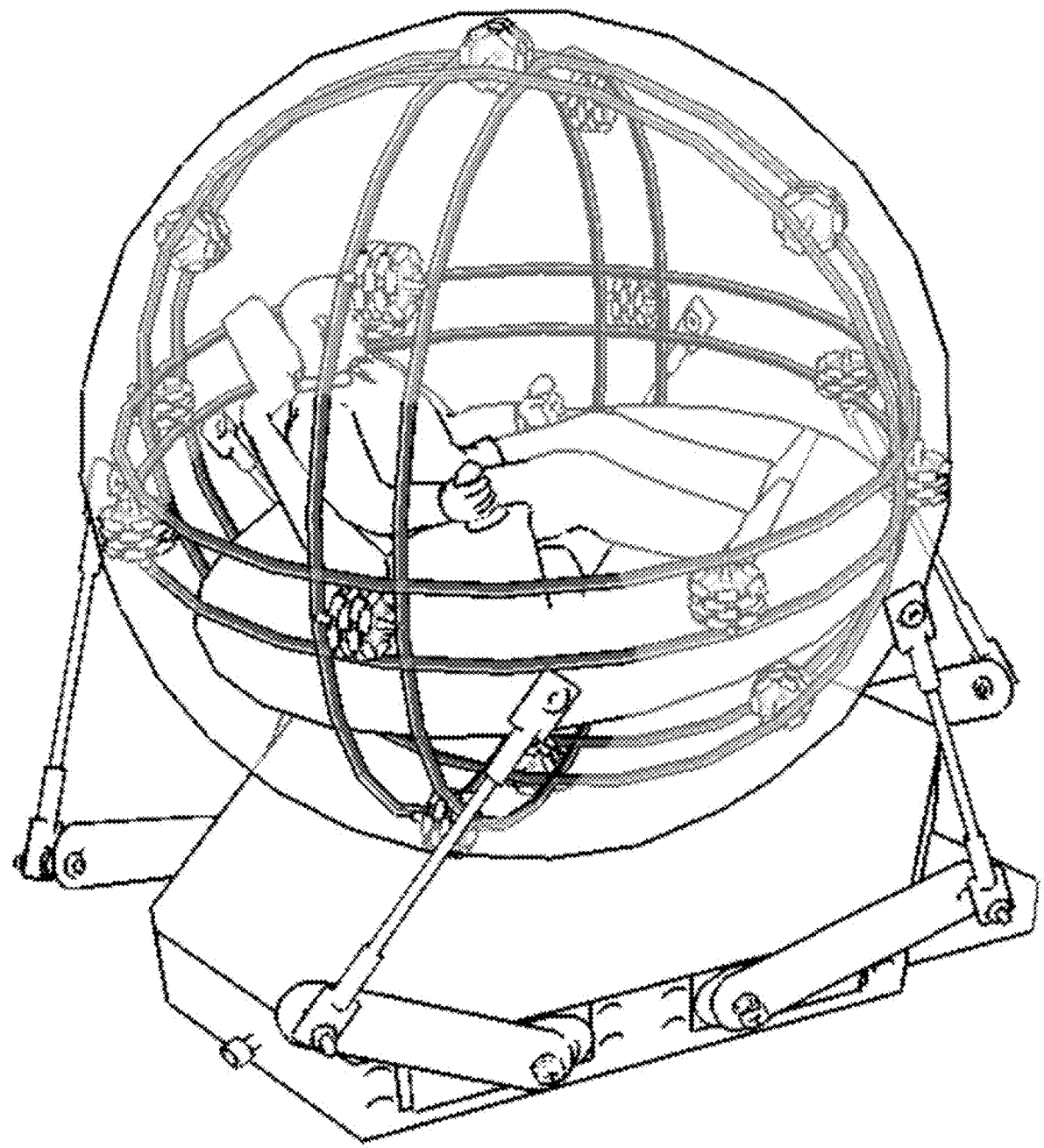

FIG. 16 is a representation of another embodiment of the motion simulator (Stewart platform supported version), according to an aspect of the present disclosure.

Figure 17:
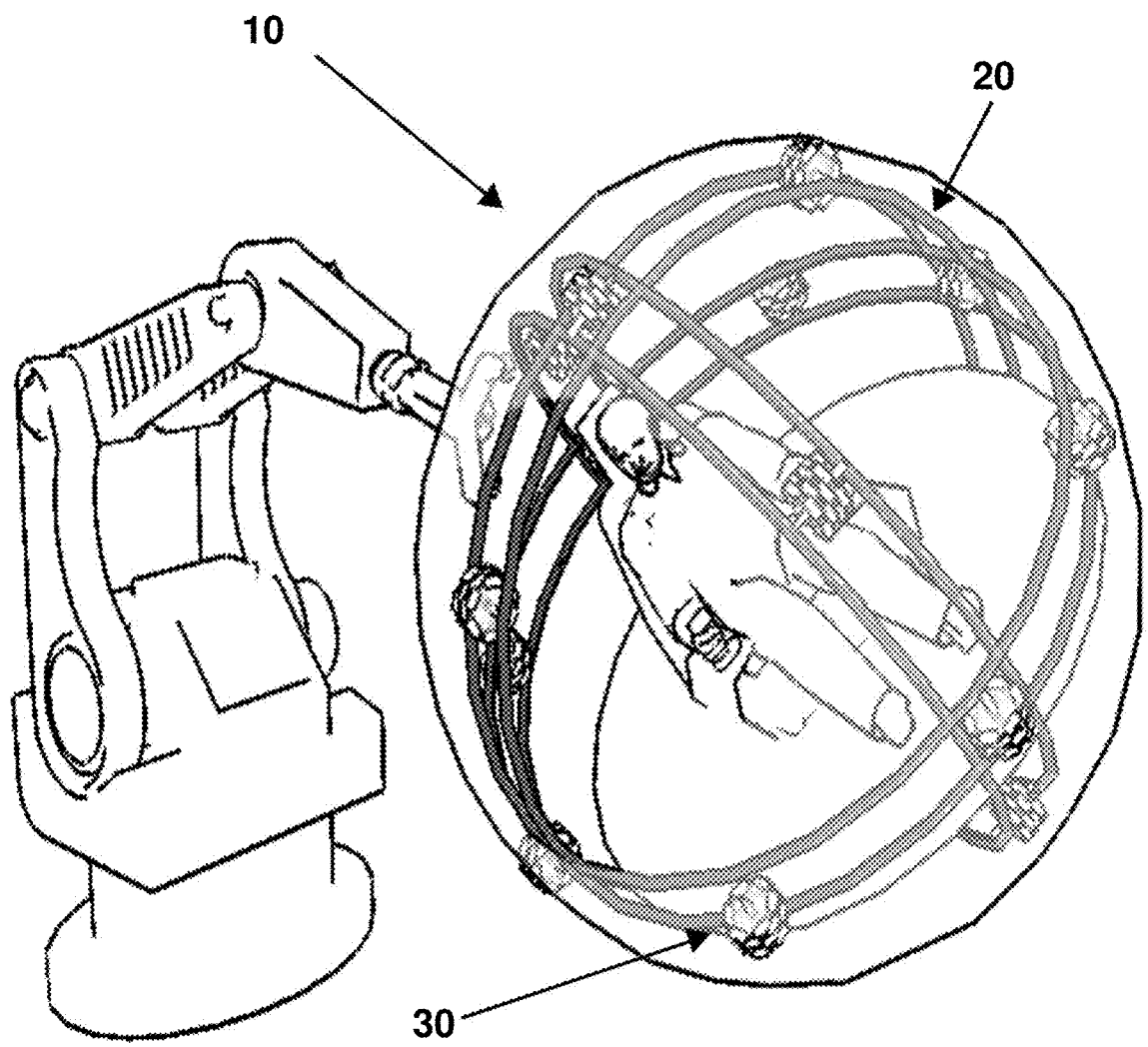

FIG. 17 is a representation of another embodiment of the motion simulator (robotic arm supported version), according to an aspect of the present disclosure.

Figure 18:
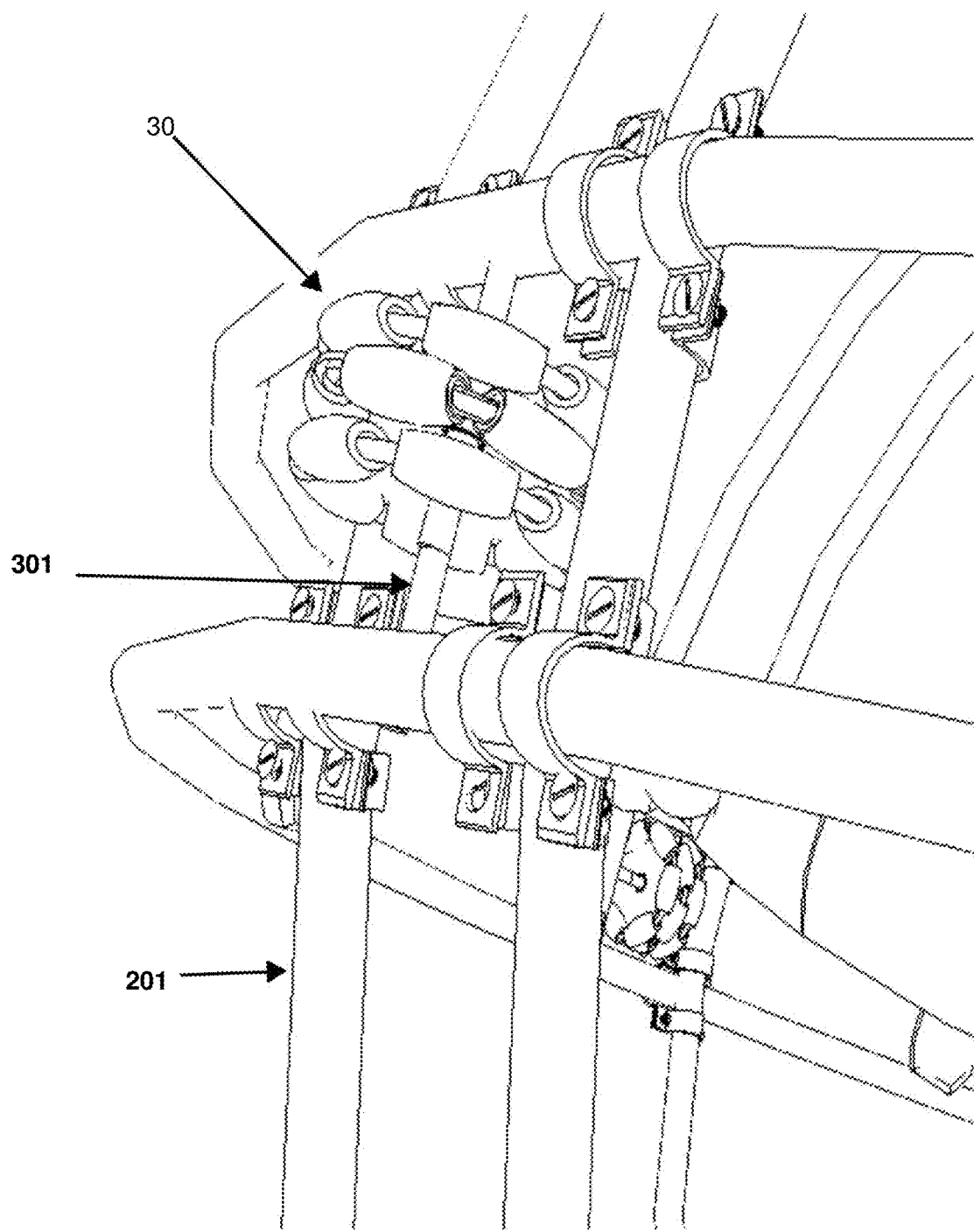

FIG. 18 is a representation of an omni wheel (30) and wheel axle (301), mounted on said chassis (20) where ring subassemblies (FIG. 11) intersect with each other, according to an aspect of the present disclosure.

Figure 19:
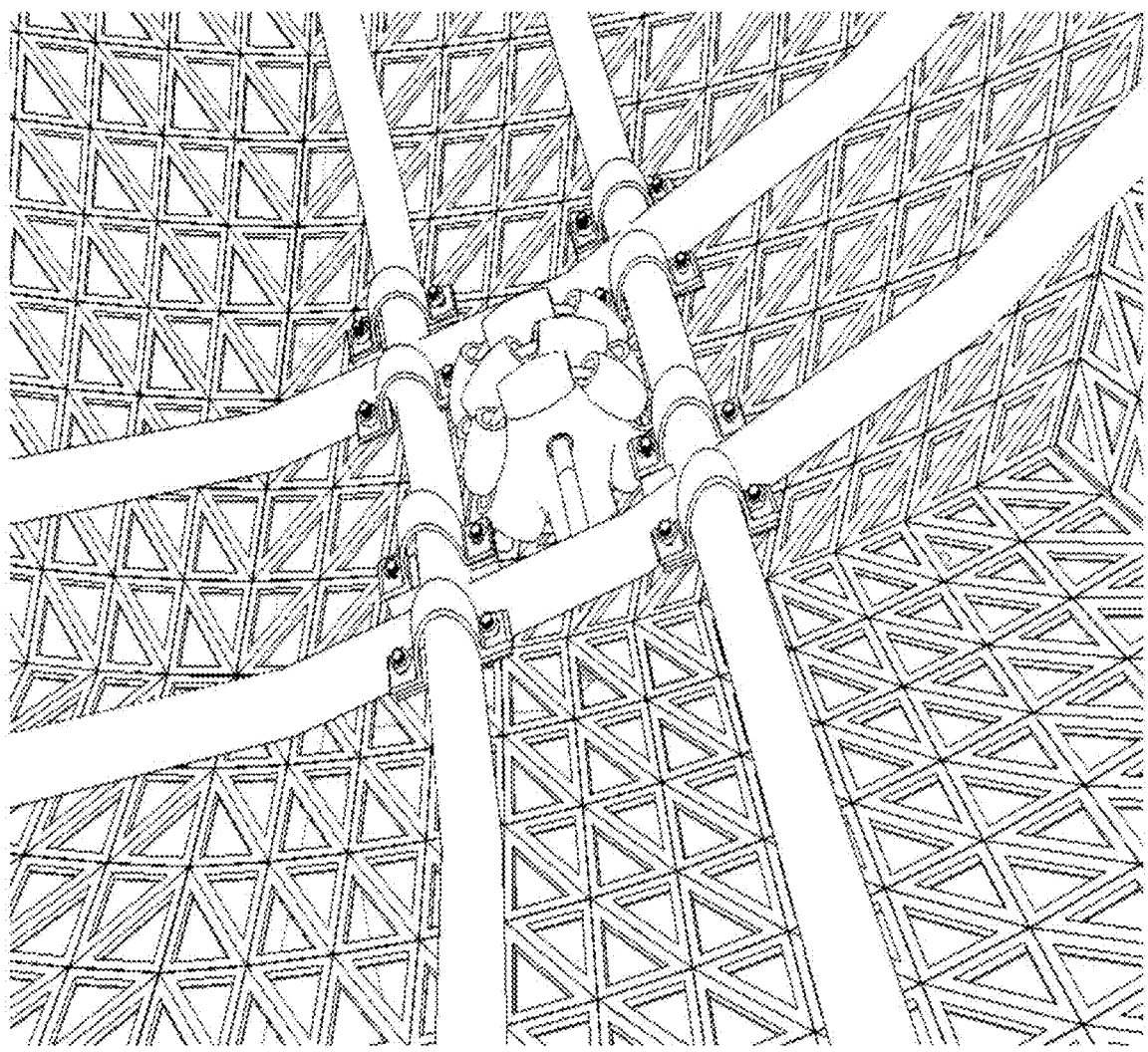

FIG. 19 is a partial close-up representation of the inside of said track (10), said omni wheel (30), said chassis (20), according to an aspect of the present disclosure.

Figure 20:
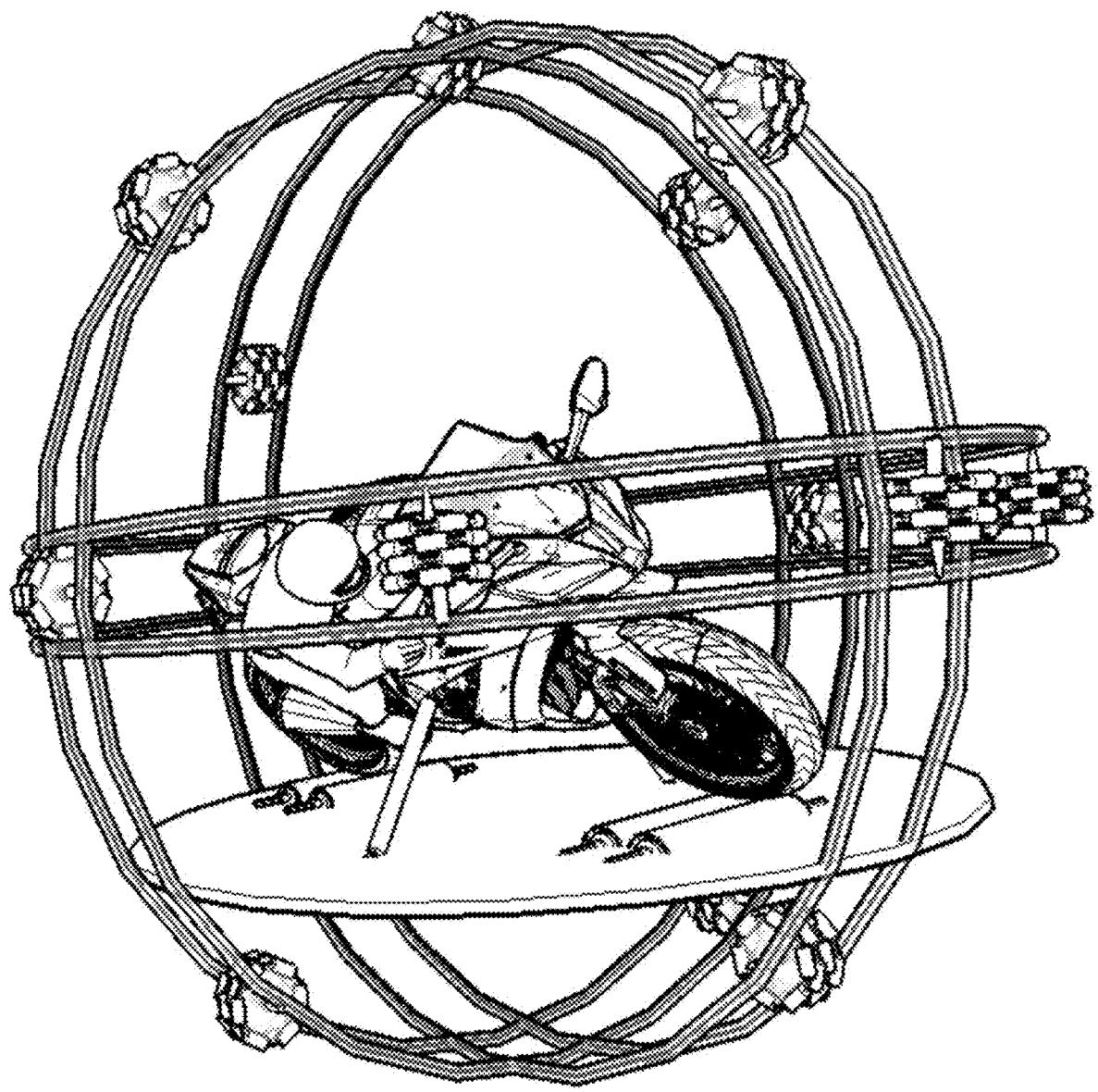

FIG. 20 is a representation of another embodiment of the motion simulator (motorcycle version) (track not shown), according to an aspect of the present disclosure.

Figure 21:
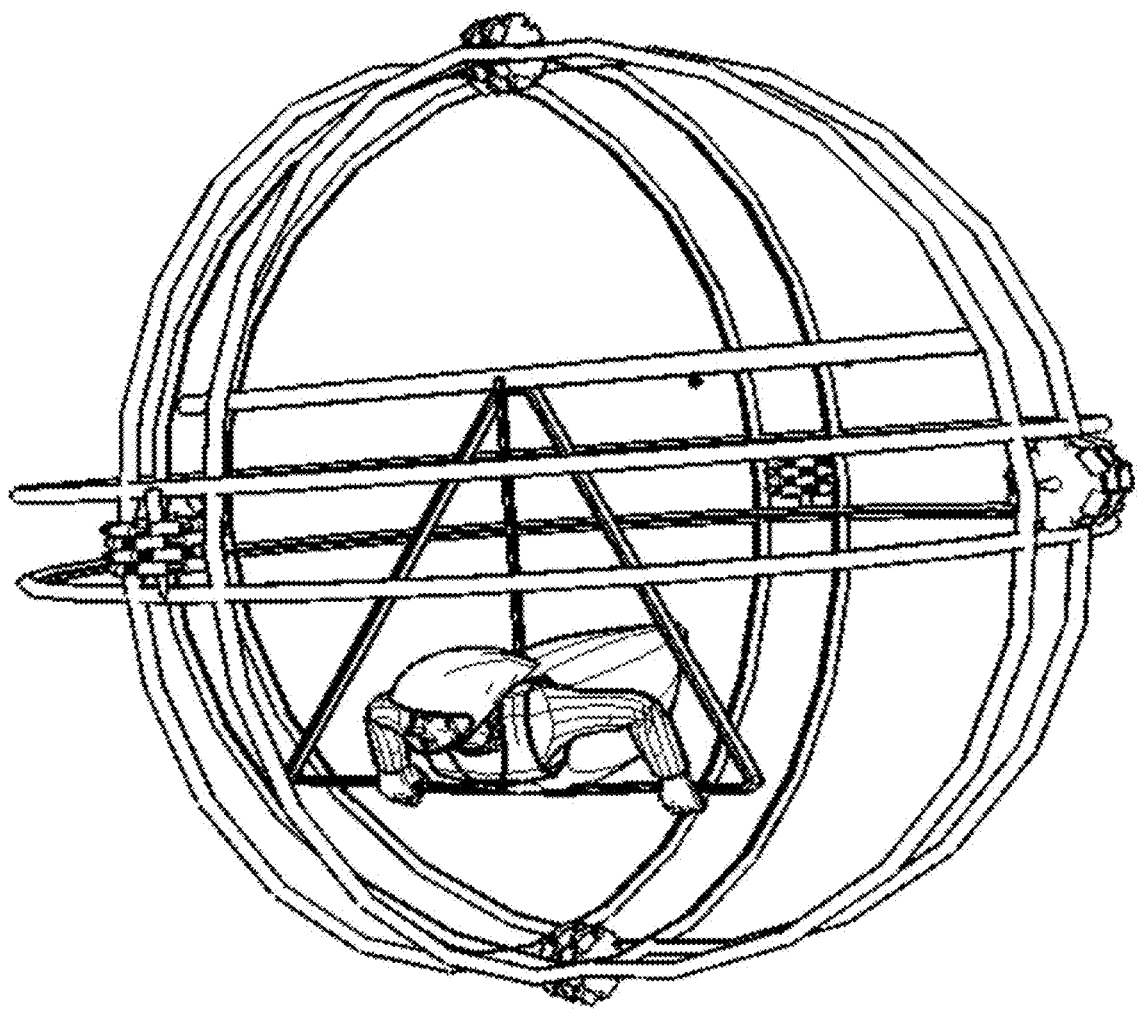

FIG. 21 is a representation of another embodiment of the motion simulator (track (10) not shown), (hang glider version), according to an aspect of the present disclosure.

Figure 22:
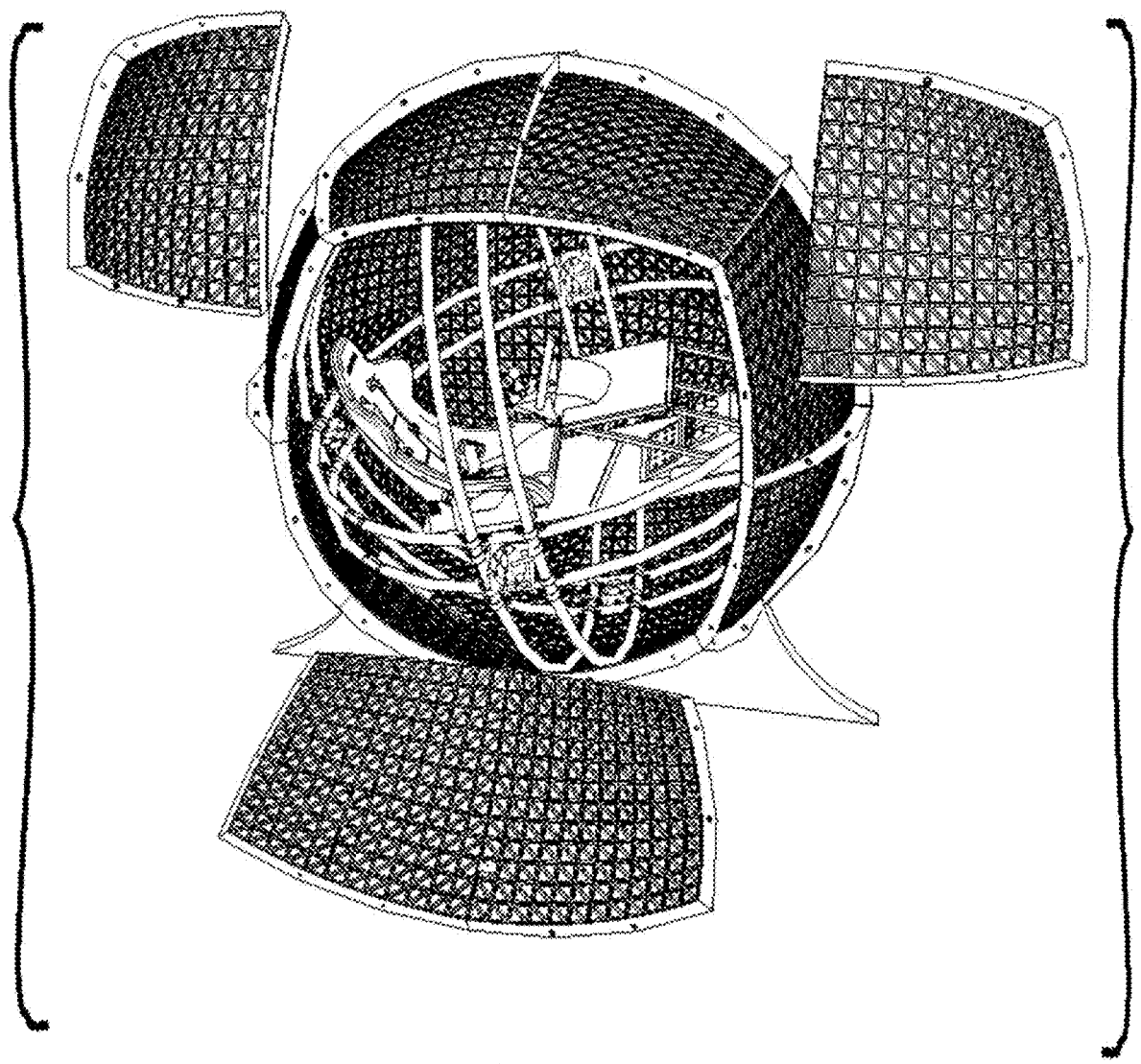

FIG. 22 is a representation of another embodiment of the motion simulator (base (70) supported version)(track (10) not shown), according to an aspect of the present disclosure.

Figure 23:
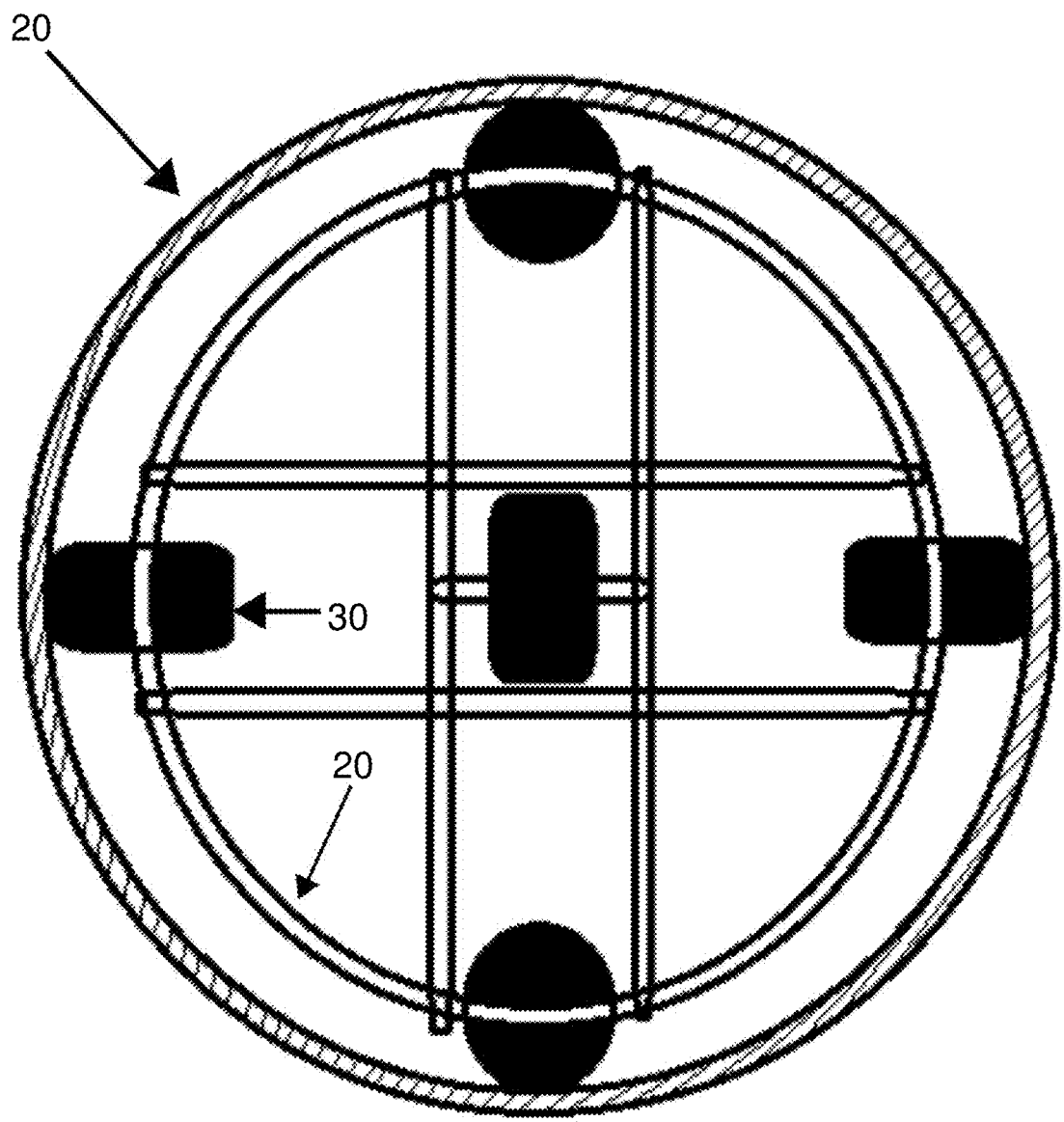

FIG. 23 represents a cross section of said track (10) which shows how said chassis (20) is free of contact from said track (10), as well as the perpendicular arrangement of said set of omni wheels (30) with respect to each other set of omni wheels (30), according to an aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts. As described herein, the use of the term "and/or" is intended to represent an "inclusive OR", and the use of the term "or" is intended to represent an "exclusive OR".

The present disclosure is directed to systems and methods for motion simulator development platforms capable of unlimited rotational motion along all rotational axes such as pitch, yaw, and roll. The present motion simulator development platform or motion simulator may include: a track, a chassis, and a plurality of omni wheels. Omni wheels are wheels that can move in any direction and oppose little or none lateral friction or resistance. The omni wheels may also be mounted to said chassis so that said omni wheels make contact with said track, but said chassis does not make contact with said track. According to one aspect of the present disclosure, said user can access the interior of said motion simulation development platform through a hatch door, an opening, or another access system. Furthermore, in this same aspect, the user can be in a standing position, and by holding both of his or her hands against and/or pressing both of his or her feet against said chassis frame and by also rocking his or her body's weight back and forth and sideways, can cause said omni wheels-mounted chassis to roll back and forth to perform full turns along said roll, pitch and yaw axes. In other words, the presently disclosed subject matter spins by the user switching his center of gravity back and forth. Moreover, by adding a few more components such as one or more power train(s), power source(s), seat(s), safety belt(s), or virtual reality (VR) headset(s), etc., the presently disclosed subject matter can be upgraded to a full-blown, versatile motion simulator capable of unlimited range of rotation for VR, gaming, flight pilot training, submarine pilot training, motorcycle driving and racing training, car driving and racing training, driver education programs, as well as hang glider pilot training and even wing suit simulation training, among many other applications. Another notable feature of the presently disclosed subject matter is that it can be made mostly with off-the-shelf components.

By positioning said user's body's center of gravity as close to said chassis' center of gravity as possible, the omni wheels-mounted chassis of the present disclosure can be easily rotated with the use of smaller, less expensive motors such as, e.g., electric ride-on-toy gearbox DC motor(s), power window motor(s), scooter motor(s), etc. As a result of using smaller motors, less expensive motor controllers can be also used—thus considerably reducing building and maintenance or repair costs.

Provided is a human powered spinning apparatus which employs a plurality of omni wheels, attached to a chassis which spins freely, in place, inside a track with unlimited range of rotation along yaw, roll and pitch axes, the apparatus comprising: (a) a track, (b) a chassis, and (c) a plurality of omni wheels.

In one aspect, access to the interior of said chassis can be provided in the human powered spinning apparatus.

In one aspect, the human powered spinning apparatus can be adapted to be powered by electric motors by adapting power trains to the omni wheels.

In one aspect, omni wheels traction can be improved by adapting a suspension system.

In one aspect, the human powered spinning apparatus has the versatility to adapt to many different types of applications such as air, land, aquatic, or a space vehicle motion simulator.

In one aspect, the human powered spinning apparatus can also be used as a FPV (first person view) remote control unit.

In one aspect, the human powered spinning apparatus can be used for remotely controlled rescue robots, drones, and every type of remotely controlled machines or remote-controlled vehicles.

In one aspect, the human powered spinning apparatus can be made up of a spherical track assembled out of 24 identical rhomboidal parts.

In one aspect, the human powered spinning apparatus can be combined with other types of motion simulators such as robotic arms, Stewart platforms, etc. in order to add extra degrees of freedom such as surge, heave, sway, etc.

The human powered spinning apparatus is easy to make, it is cost effective, it is versatile, it is up gradable, it has numerous applications, e.g. in the virtual reality (VR) industry, in the food industry, as a mixer, or as a cooker or a revolving cooker. The human powered spinning apparatus is also scalable, meaning it can be made very big, to hold many "passengers", or it can also be made very small. The human powered spinning apparatus can be used as a comfortable reclinable laptop seat, can be made kids size, and employs mostly off the shelf components to build. The human powered spinning apparatus also is the first battery operated motion simulator, and the first system ever to couple omni wheels to a chassis that spins inside a closed or semi-closed track, the first motion platform which can be combined with other types of motion simulator platforms such as, Stewart platforms and robotic arm platforms, which increases the number of degrees of freedom. Finally, the human powered spinning apparatus has omni wheels which allow the mechanism to spin freely because regular (e.g. unidirectional) wheels would not work in the invention at all, because they oppose high lateral resistance.

As various changes and modifications could be made to the above embodiments without departing from the scope of the invention, it is intended that all matter contained in the above description or shown in the accompanying drawings shall be interpreted as illustrative and not in a limiting sense.

The presently disclosed subject matter may be understood more readily by reference to the following detailed description of the disclosed subject matter, along with the accompanying drawings, which form a part of this disclosure. It is to be understood that this disclosed subject matter is not limited to the specific devices, methods, conditions or parameters described and/or shown herein, and that the terminology used herein is for the purpose of describing particular embodiments by way of example only and is not intended to be limiting of the claimed disclosed subject matter. Following below are general descriptions of some possible different embodiments of the disclosed subject matter.

Other potential embodiments not shown, but contemplated include: a Triaxial, unlimited-rotational-range Submarine motion simulator embodiment, and a Triaxial, unlimited-rotational-range, substance mixing machine embodiment.

A triaxial-limitless-degrees-of-rotational-motion cooking pot embodiment. A triaxial-360-degrees-of-rotational-motion video camera embodiment.

A triaxial-limitless-degrees-of-rotational-motion roller-coaster motion simulator embodiment. An omnidirectional-vehicle-mounted embodiment. claims A triaxial-limitless-degrees-of-rotational-motion motion simulator (race car version) wherein a user is positioned inside said chassis in order to be able to experience multi directional motion within said track, according to an aspect of the present disclosure.

What is claimed is:

1. A wheel-based human-powered spinning system comprising:
   a chassis configured to secure a user, wherein said chassis includes: a first set of omni wheels oriented with a pitch axis, a second set of omni wheels oriented with a roll axis, and a third set of omni wheels oriented with a yaw axis;
   a track surrounding said chassis; and
   wherein said chassis spins with unlimited range of motion about at least one, and up to three, of the pitch, roll and yaw rotational axes on said track while supported by at least one of the first, second and third set of omni wheels.

2. The system of claim 1, wherein said chassis is configured to allow rotational movement within said track, and said track is configured to allow the chassis to spin therein.

3. The system of claim 1, wherein said track is the only component of the system attached to a motion system to add at least one additional degree of movement.

4. The system of claim 1, wherein said chassis is configured to enable a user to stand, sit, lie down or be positioned inside a vehicle on a platform secured to said chassis.

5. The system of claim 4, wherein said vehicle includes a motorcycle, a helicopter, a hang glider, an automobile, a submarine, an airplane, a spaceship, and a drone.

6. The system of claim 4, wherein said track includes an access to enable said user to access the inside of said chassis and be positioned within said chassis.

7. The system of claim 1, wherein said chassis includes a power source for powering a plurality of motors operable with said first, second and third sets of omni wheels, such that said first, second and third sets of omni wheels spin, wherein said first, second and third sets of omni wheels are fixedly connected to said chassis, and wherein said plurality of motors includes electric ride-on-toy gearbox motors, power window motors, scooter motors, internal combustion motors or electric motors.

8. A wheel-based human-powered spinning system comprising:
a chassis configured to secure a user;
a track surrounding said chassis; and
a plurality of omni wheels including a first set of the plurality of omni wheels oriented with a first rotational axis, a second set of the plurality of omni wheels oriented with a second rotational axis, and a third set of the plurality of omni wheels oriented with a third rotational axis, wherein at least one of the plurality of omni wheels is attached to said chassis,
wherein said chassis is configured to spin with unlimited range of motion about at least one, and up to three, of the first, second and third rotational axes on said track while supported by said plurality of omni wheels.

9. A wheel-based human-powered spinning system comprising:
a chassis configured to spin a user
a plurality of omni wheels connected to the chassis, the plurality of omni wheels including:
a first set of omni wheels oriented with a pitch axis,
a second set of omni wheels oriented with a roll axis, and
a third set of omni wheels oriented with a yaw axis; and
a track connected to said chassis to surround said chassis, the track and the first, second and third sets of omni wheels enabling said chassis to spin with unlimited range of motion about at least one, and up to three, of the pitch, roll and yaw.

10. The system of claim 9, wherein the chassis spins about at least one of the pitch, roll and yaw axes based on movement of the user.

11. The system of claim 9, further includes one or more motors operatively connected to said plurality of omni wheels such that said one or more motors cause said plurality of omni wheels to spin, forwards and/or backwards, producing torque and traction on said omni wheels, against the surface of said track, to rotate said chassis concentrically.

12. The system of claim 9, wherein said track is fixedly connected to a motion system to add at least one additional degree of movement.

13. The system of claim 12, wherein said motion system includes a Stewart platform or a robotic arm and wherein said at least one additional degree of movement includes sway, heave, pitch, roll or yaw.

* * * * *